Feb. 8, 1927. 1,616,514
R. SWIMMER
WATER AND SOAP SPRAY
Filed March 7, 1924 4 Sheets-Sheet 4
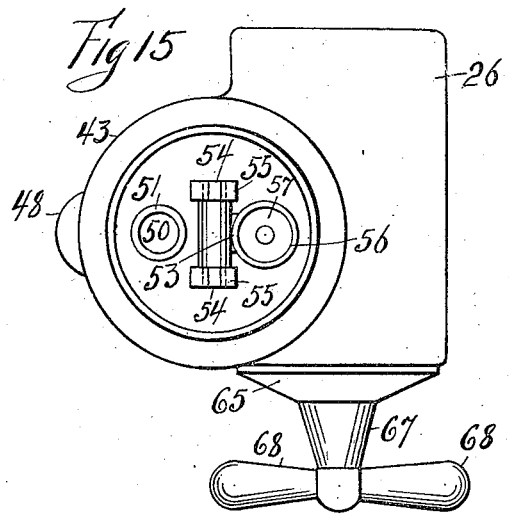
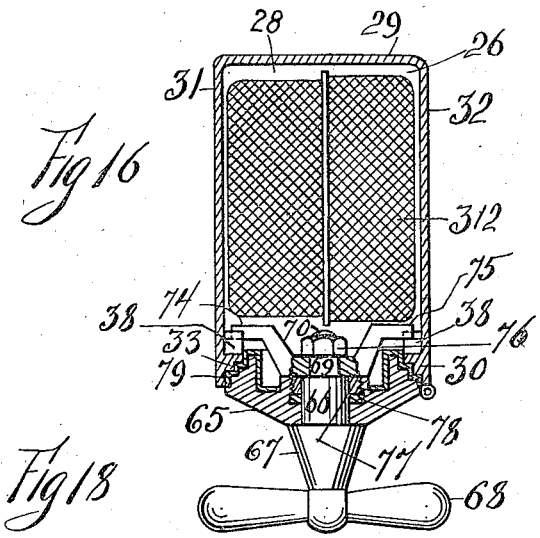
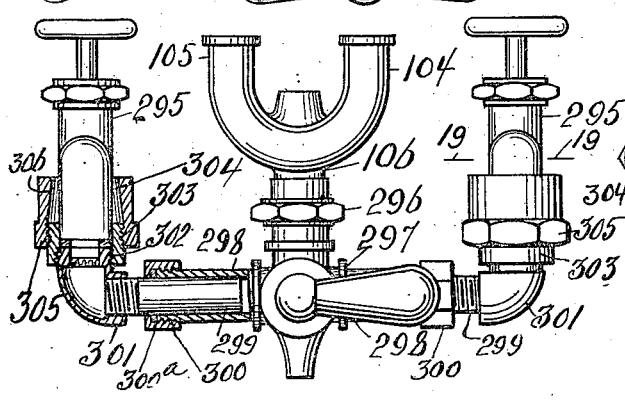
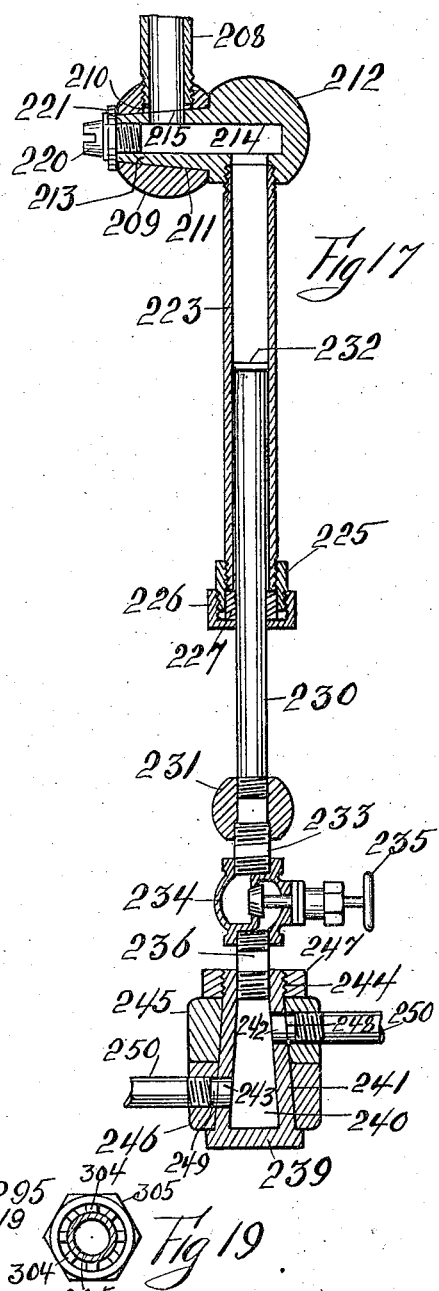
INVENTOR
Robert Swimmer
BY A. A. de Bonneville
ATTORNEY Patented Feb. 8, 1927.

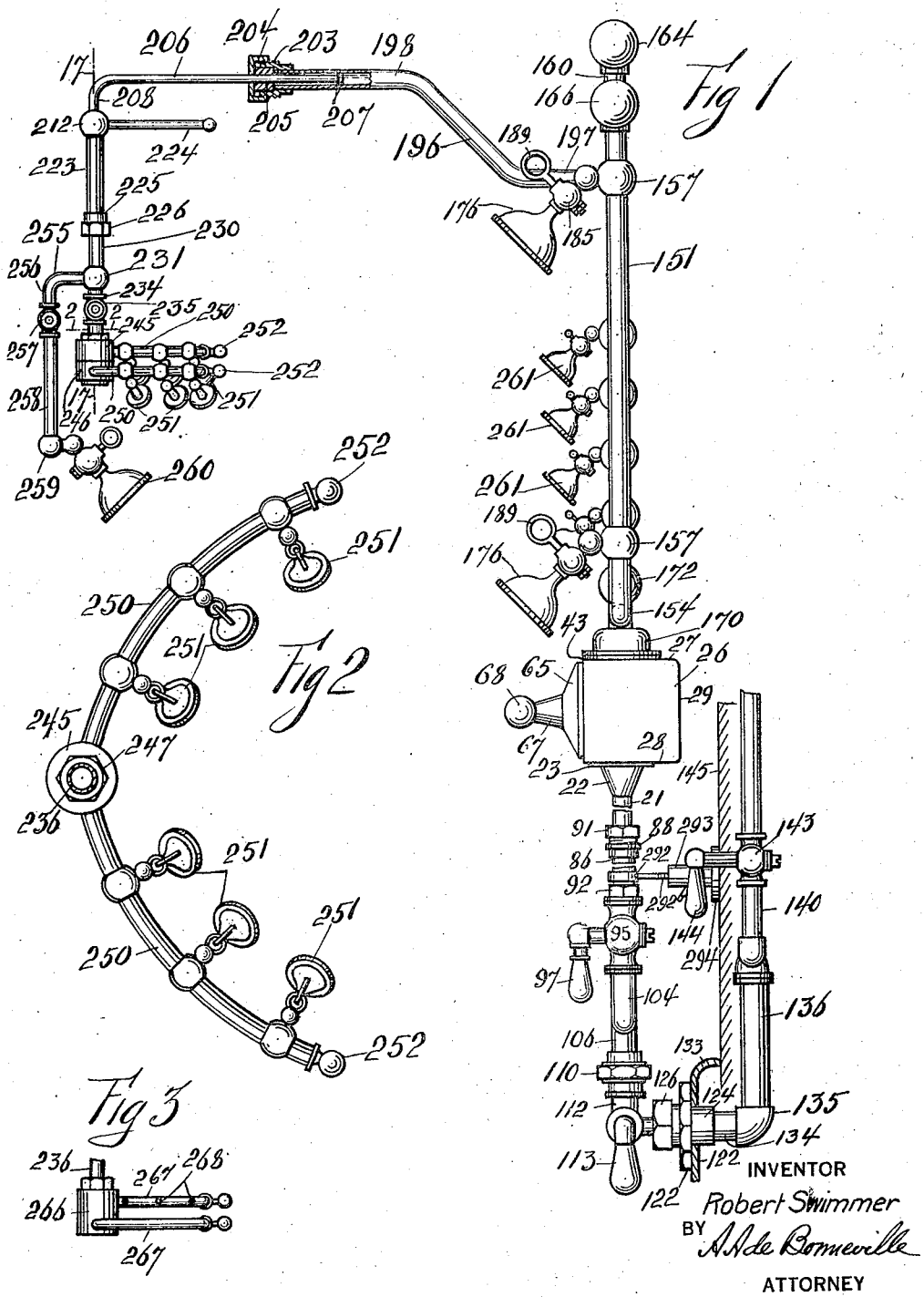

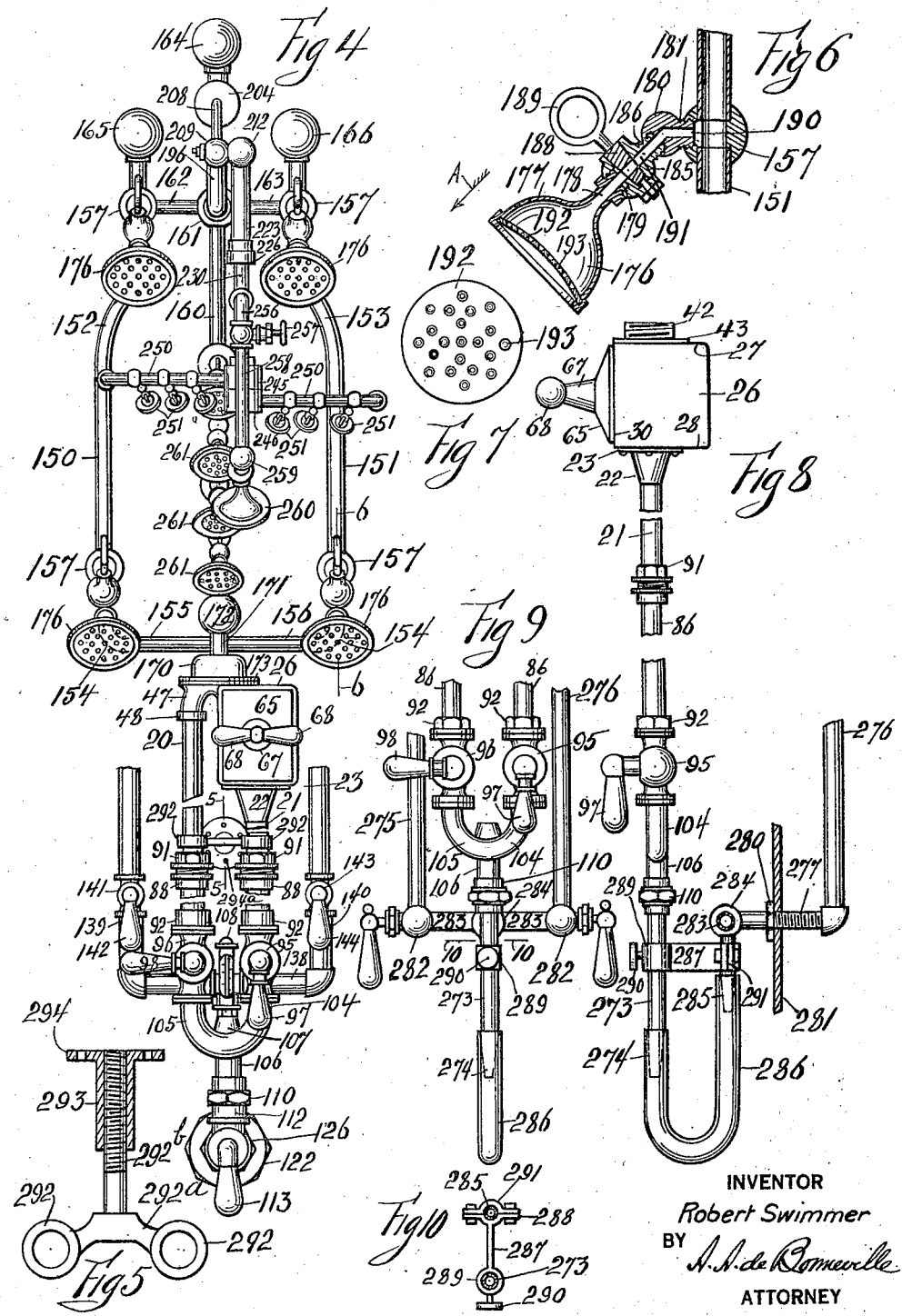

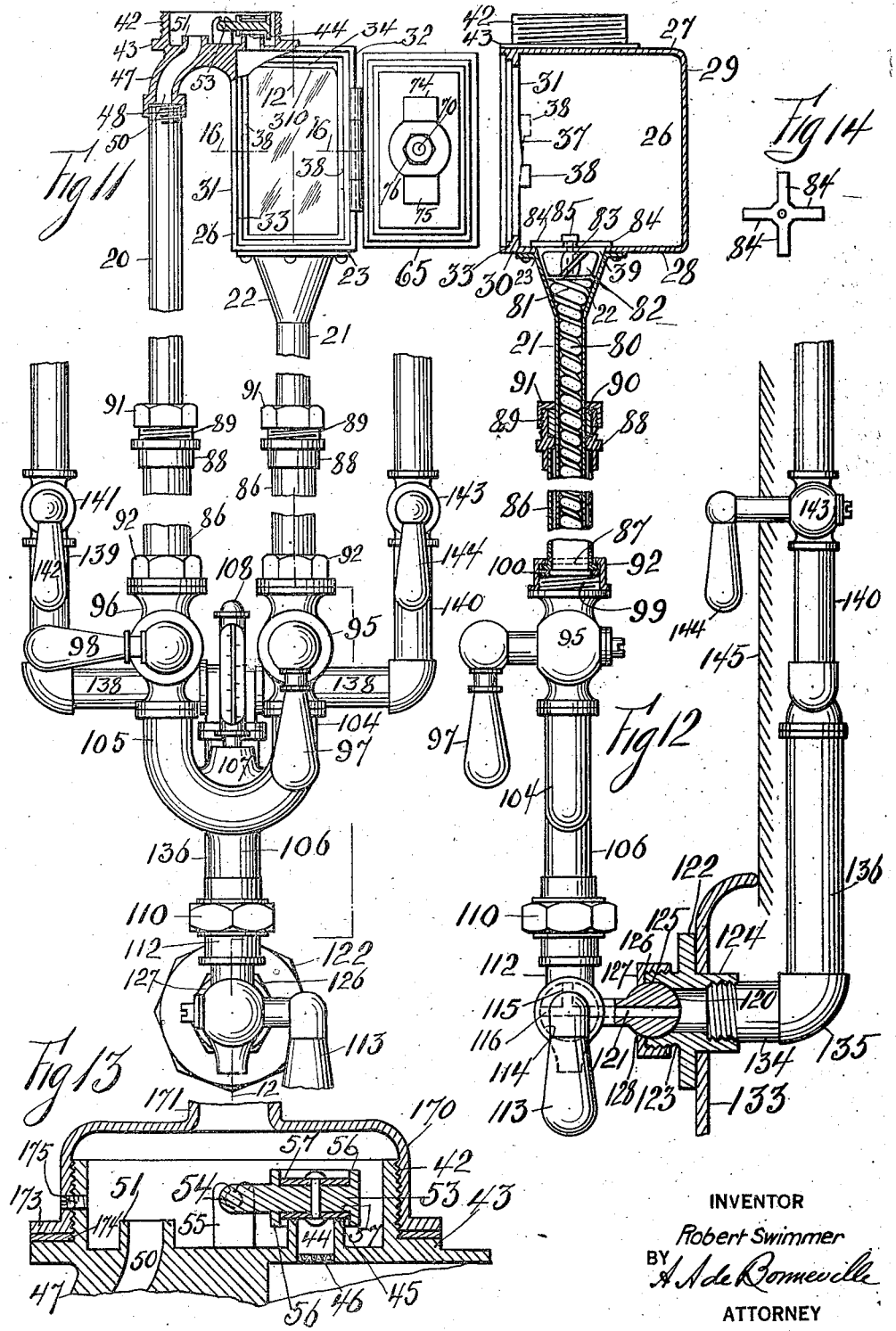

1,616,514

UNITED STATES PATENT OFFICE.

ROBERT SWIMMER, OF NEW YORK, N. Y.

WATER AND SOAP SPRAY.

Application filed March 7, 1924. Serial No. 697,568.

This invention relates to water and soap sprays, and comprises improvements of my inventions for similar devices described and claimed in my United States patents respectively: No. 1,220,704 dated March 27th, 1917, for sanitary curtainless soap and water spray; No. 1,248,573, dated December 4th, 1917, for soap receptacle bath spray and No. 1,397,344 dated November 15th, 1921, for soap dispensing apparatus.

The present invention has for its object the production of water and soap sprays, by means of which sprays of fluids can be obtained flowing in one direction with other sprays flowing in a reversed direction. A second object of the invention is the production of means whereby the sprays can be easily and detachably connected to bath fixtures and the like of different forms. A third object of the invention is the production of means whereby a plurality of streams can be directed to intersect each other, and at the same time remain within predetermined limits, like the edges of a ordinary bath tub. A fourth object of the invention is the production of means to dissolve soap or medicinal substances in the fluid which is sprayed from the apparatus. A fifth object of the invention comprises means to twirl a fluid as it flows through a receptacle of the apparatus, to enhance the dissolution of a substance located therein. A sixth object is the production of water and soap sprays, wherein any water hammer of the fluid flowing therethrough is reduced to a minimum.

In the accompanying drawings, Fig. 1 represents a side elevation partly in axial section, of a water and soap spray in operative position, exemplifying the invention; Fig. 2 shows an enlarged section of Fig. 1 on the line 2, 2; Fig. 3 represents a fragmentary modified portion of Fig. 1; Fig. 4 represents a front elevation of the water and soap spray; Fig. 5 shows an enlarged section of Fig. 4 on the line 5, 5; Fig. 6 is an enlarged section of Fig. 4 on the line 6, 6; Fig. 7 indicates a plan view of a detail of Fig. 6 viewed in the direction of the arrow A; Fig 8 represents a fragmentary portion of Fig. 1 with a modification; Fig. 9 shows a left hand side view of a portion of Fig. 8; Fig. 10 indicates a section of Fig. 9 on the line 10, 10; Fig. 11 shows an enlarged portion of Fig. 4 with a small portion thereof in vertical axial section; Fig. 12 represents a side view and section of Fig. 11 on the broken line 12, 12; Fig. 13 shows an enlarged view of a portion of Fig. 11; Fig. 14 shows a top plan view of a detail of Fig. 12; Fig. 15 represents an enlarged top plan view of a portion of Fig. 11; Fig. 16 shows an enlarged section of Fig. 11 on the line 16, 16 with some of the elements in changed position; Fig. 17 indicates an enlarged section of Fig. 1 on the line 17, 17; Fig. 18 represents an enlarged fragmentary front view of the spray with a modification partly in axial section and Fig. 19 shows a section of Fig. 18 on the line 19, 19.

A pair of conduits or pipes are indicated at 20 and 21. The upper end of the pipe 21 has extending therefrom the flared end 22 with the flange 23. A receptacle is shown in its entirety by the numeral 26. The said receptacle is indicated with the roof or top wall 27, the bottom wall 28, the rear wall 29, the front wall 30 and the side walls 31 and 32. The front wall 30 has formed therewith the steps 33, which form the perimeter of an opening 34 in said front wall. A pair of latch projections are each indicated with the inclined seat 37 and the stop lug 38. The said projections extend inwardly from the vertical members of the steps 33 on opposite sides of the opening 34. The bottom wall 28 has formed therein an opening 39, which is axially in line with the flared end 22, which latter has its flange 23 fastened to said bottom wall 28 of the receptacle 26.

A threaded sleeve 42 is indicated with the flange 43, which latter is formed with and extends beyond the wall 27 of the receptacle 26. A port 44 is formed in the wall 27 and has formed therewith the valve seat 45, which extends into the sleeve 42. A screen 46 is secured in the port 44. From the extended portion of the flange 43 is formed the extension 47 with the threaded flange 48 at its lower end. The flange 48 is in threaded engagement with the upper end of the pipe 20. A port 50 is formed in the extension 47, which extends through the flange 43 and has formed therewith the valve seat 51.

A valve 53 actuates within the sleeve 42 over the ports 44 and 50, and has formed therewith a pair of trunnions 54, which are supported in the journal bearings 55, which extend up from the flange 43. The said valve 53 has extending from its opposite faces the annular flanges 56. Discs 57 of pliable material are fastened to the valve 53 on opposite sides, within the flanges 56.

A door 65 is hinged to the side wall 32 of the receptacle 26, and its perimeter is shaped to engage the perimeter of the opening 34 of the said receptacle 26. A spindle 66 extends through the door 65 and has formed therewith the extension 67 for the operating handle 68. A squared projection 69 extends from the spindle 66 and has in turn extending therefrom a threaded shank 70. A latch with the wings 74 and 75 is supported on the squared projection 69, and is held in place by the nut 76 on the threaded shank 70. The wings 74 and 75 bear on the inclined seats 37 of the latch projections, when the door 65 closes the opening 34 of the receptacle 26. The coaction of the wings 74 and 75 and the inclined seats 37 draw the door tightly to the steps 38 when the door is in its closed position.

A stuffing box is formed in the door 65, and comprises the threaded gland 77, which engages a threaded opening in said door and maintains the packing 78 in the said opening in proper position.

The said packing 78 prevents leakage between the spindle 66 and the door 65. Packing 79, preferably of leather, is secured to the inner face of the door 65 and extends between the steps of said door and the opening 34 of the receptacle 26.

A helical guide 80 is located in the pipe 21 which at its upper end has a flared head 81. A propeller wheel 82 is journaled on a pin 83 extending up from the upper end of the helical guide 80. A guard is shown with arms 84, which are supported on the wall 28 of the receptacle. The pin 83 extends through the hub of the guard and a nut 85 in threaded engagement with the pin 83 bears on the boss of said guard.

Each of the pipes 20 and 21 telescopes with a pipe 86, which has formed therewith at its lower end the flange 87. Stuffing boxes are interposed between the pipes 20, 21 and 86 and each comprises the sleeve 88, with the threaded upper end 89. The sleeves 88 are fastened to the upper ends of the pipes 86. Packing 90 is located in the annular spaces between the pipes 20, 21 and the threaded upper portion of each sleeve 88. A hexagonal cap 91 is in threaded engagement with each threaded end of the sleeves 88. An hexagonal cap 92 encircles the lower end of each pipe 86.

A pair of valves 95 and 96, respectively, with the operating handles 97 and 98, have each formed therewith the threaded upper end 99. The hexagonal caps 92 engage the threaded ends 99 and an annular packing ring 100 is interposed between the bottom face of the flange 87 and the top face of the threaded end 99.

A Y shaped fitting comprises the pair of members 104 and 105, which converge and connect with the lower member 106. A boss 107 extends up from the fitting between the members 104 and 105 and supports the thermometer 108.

A union 110 has its upper end connected to the member 106. A valve casing 112 with the operating handle 113 is connected to the union 110. A plug valve 114 with the ports 115 and 116 is provided for the casing 112. A spherical end 120 with the port 121, is connected to the valve casing, and the said port 121 extends through the valve casing 112. A fitting comprises the octagonal flange 122, with a sleeve exteriorly threaded at 123 and interiorly threaded at 124. A seat 125 is formed in the sleeve and upon which the spherical end 120 bears, forming a ball and socket connection. A cap nut 126 is shown with the crown 127 having the opening 128. The said nut is in threaded engagement with the threads 123 of said sleeve, and the crown 127 bears against the spherical end 120. The flange 122 bears against the wall 133 of a bath tub. A nipple 134 at one end is in threaded engagement with the threads 124 and at its other end is in engagement with the elbow 135. A vertical pipe 136 extends up from the elbow 135 and is in turn connected to the horizontal piping 138. Piping 139 for hot water and piping 140 for cold water extends from the piping 138. A valve 141 with the operating handle 142 is connected to the piping 139, and a valve 143 with the operating handle 144 is connected to the piping 140. The pipe 136 with the piping 138, 139 and 140 is indicated below the outer face of the wall 145. The object of the spherical end 120 and its connection to the seat 125 constitutes a ball and socket joint, by means of which the Y shaped fitting and its connections can be located in different angular positions.

A pipe frame is indicated with the two vertical outer pipes 150, 151, which in this instance converge somewhat at their upper ends as indicated respectively at 152 and 153.

The pipes 150 and 151, at their bottom ends are curved as indicated at 154 to form the horizontal branches 155 and 156. Spherical fittings 157 are connected to the upper and lower portions of the pipes 150 and 151. A central vertical pipe 160 of the pipe frame has connected to its upper portion a spherical fitting 161. Horizontal branch pipes 162 and 163 connect the spherical fitting 161 and the fittings 157 at the upper portions of the pipes 150 and 151. An air chamber 164 is connected to the upper end of the vertical pipe 160 and air chambers 165 and 166 are respectively connected to the upper ends of the pipes 150 and 151, to reduce the water hammer in the said pipe to a minimum.

A cap 170 is shown with the neck 171, the spherical fitting 172 and the flange 173. The cap 170 is in threaded engagement with the threaded sleeve 42 of the receptacle 26, and a packing 174 is preferably interposed between the flanges 43 and 173. A screw 175 may connect the cap 170 and the sleeve 42. The branch pipes 155 and 156 are connected to the neck 171. The lower end of the pipe 160 is connected to the fitting 172. Spray heads 176 are connected to the spherical fittings 157 of the pipes 150 and 151.

Each of said spray heads 176 comprises the cup-shaped body portion 177 with the neck 178, which terminates in the threaded shank 179. A spherical fitting 180 has formed therewith a threaded shank 181, which is in threaded engagement with its adjacent spherical fitting 157. A valve casing 185 has formed at one end the threaded shank 186 which is in threaded engagement with the fitting 180, and the shank 179 is in turn in threaded engagement with the valve casing 185. A plug valve 188 with the operating handle 189 is seated in the valve casing 185. A horizontal port 190 extends through the fitting 157, the shank 181 and a portion of the fitting 180. In the latter fitting 180, the port 190 connects with the inclined port 191, which extends through the valve casing 185 to the neck 178. A spray plate 192 is connected to the outer end of the body portion 177, and is concaved on its outer face and convexed on its inner face. Tapered openings 193 are formed in the plate 192, which converge from its inner to its outer face. The said plate is preferably made of glass to be enabled to spray fluids with medicinal substances therethrough. The fitting 180 can be turned to different positons relative to the fitting 157, and the valve casing 185 can be turned to different positions relative to the fitting 180, to be enabled to converge the streams from the spray heads extending from the pipes 150 and 151. By means of the adjustable function of the parts of the spray heads, the streams discharged therefrom can be easily confined within the walls of a bath tub.

An inclined pipe 196 is shown with the lower horizontal portion 197 and the upper horizontal portion 198. The portion 197 is connected to the fitting 161 and to the end of the portion 198 is connected a stuffing box comprising the exteriorly threaded portion 203 with the cap 204 and the packing 205. A pipe 206 telescopes with the portion 198 and has connected to one end thereof the flange collar 207, and its other end has connected thereto the leg 208. A spherical fitting 209 has an opening 210 which is threaded for the leg 208. A tapered valve seat 211 is formed in the fitting 209. A spherical fitting 212 has extending therefrom the tapered plug valve 213, which is seated on the seat 211 and forms a valve therewith. An opening 214 is formed in fitting 212 and the plug 213 and connects with the port 215 in said plug.

The outer end of the opening 214 is threaded for the screw 220 and a washer 221 is interposed between the head of the screw 220 and the fitting 209.

A pipe 223 extends from the fitting 212 and an operating handle 224 extends therefrom. A stuffing box comprises the sleeve 225 which is interiorly threaded and connected to the lower end of the pipe 223. A cap 226 is in engagement with the exterior threads at the lower end of the sleeve 225. Packing 227 is maintained in proper position by the cap 226. A pipe 230 telescopes with the pipe 223 and has connected to its lower end the spherical fitting 231 and to its upper end is connected the flange collar 232. A nipple 233 is in threaded engagement with the fitting 231 and in turn supports the valve 234 having the operating wheel 235. A nipple 236 extends from the valve 234, which in turn supports the tapered plug 239 having the cavity 240. The outer surface 241 of the plug 239 constitutes a valve. Ports 242 and 243 are formed in the wall of the plug 239. The upper end of the plug 239 is threaded at 244. A casing comprises the rotatable members 245 and 246 which are supported on the plug 239. A nut 247 is in threaded engagement with the threads 244. Curved spray pipes 250 have one end of each connected to the members 245 and 246 in openings 248 and 249 thereof that may be located in alignment with the ports 242 and 243. Each of the pipes 250 has connected thereto spray heads 251 similar to 176, and the ends of the pipes 251 are fitted with the plugs 252.

A pipe is shown with the horizontal leg 255 and the vertical leg 256. The leg 255 extends from the spherical fitting 231 and to the leg 256 is connected the valve 257. A vertical pipe 258 extends from the valve 257 and has connected to its lower end the spherical fitting 259.

A spray head 260 similar to 176 extends from the fitting 259 and is reversed in position to the spray heads 176. To the central vertical pipe 160 of the pipe frame are connected a plurality of spray heads 261, which are preferably smaller but similar to the spray heads 176. The spray heads 251 can be used for either an overhead shower spray or may be used for spraying directly against the body of the user. The spray head 260, in connection with the spray heads 251, 176 and 261, enables the user to be sprayed simultaneously on opposite sides of the body.

In Fig. 3 the invention is modified so that instead of employing the movable members 245 and 246 of the casing below the nipple 236, one casing 266 is employed. This latter casing is directly connected to the nipple 236. Curved pipes 267 similar to 250 having outlet openings 268 extend from the casing 266.

In Figs. 8 and 9 the invention is modified as to its connection to the water supply thereof. It is indicated with the Y shaped fitting having the pair of members 104 and 105 and the lower member 106. The valves 95 and 96, as already described, extend up from the said members 104 and 105. The union 110 extends from the member 106 and in turn has depending therefrom the pipe 273, with the hose coupling nipple 274. The pipes 86 are indicated above the valves 95 and 96, and the pipe 21 is indicated with the receptacle 26. A hot water supply pipe is shown at 275 and a cold water supply pipe is shown at 276. Horizontal pipes 277 extend from each of the pipes 275 and 276. A nut 280 engages each of the pipes 277 to bear against the wall 281 of a bath tub.

Valves 282 are connected to the lower ends of the pipes 275 and 276, and cross branch pipes 283 extend from the valves 282. The latter are in turn connected to the central fitting 284, from which extends the hose coupling nipple 285. A rubber hose 286 connects the nipples 273 and 285.

A pipe clamp is indicated with the body portion 287, having the cross member 288 at one end and the sleeve 289 with the clamping screw 290 at the other end. A detachable member 291 is bolted to the cross-member 288. The pipe 273 is clamped in the sleeve 289.

To support the pipe frame in place (see Figs. 1, 4 and 5) a bracket connects the U shaped fitting and the wall 145. The bracket comprises the pair of collars 292 which are connected by the cross member 292ª and from which extends the threaded shank 292ᵇ. A threaded sleeve 293 with the flange 294 is in threaded engagement with the shank 292ᵇ. To locate the apparatus in place, the collars 292 are first placed around the members 104 and 105 of the U shaped fitting and the sleeve is turned to bear against the wall 145, after which the said flange is fastened to said wall by means of the screws 294ª.

In Figs. 18 and 19 is indicated a construction to clamp the water and soap spray to a pair of faucets. The faucets are indicated at 295. The Y shaped fitting is indicated with the members 104 and 105 and the lower member 106. To the latter is connected the union 296. A valve 297 is connected to the union 296 and a pair of horizontal pipes 298 extend from the valve 297. Pipes 299 telescope with each of the horizontal pipes 298. A cap nut 300 is in threaded engagement with each pipe 298 and maintains the packing 300ª in proper position between the pipes 298 and 299. Each of the pipes 299 has connected thereto an elbow 301 exteriorly threaded at 302. To the upper end of each elbow 301 is held in threaded engagement, the sleeve 303 with the prongs 304. The said prongs hug the faucet 295. A nut 305 with the tapered inner wall 306 encircles the sleeve 303 with its prongs 304.

In the receptacle 26 may be located a cake of soap 310 (see Fig. 11) or the receptacle may contain a cage 312 having perforated walls for a medicinal substance. (See Fig. 16.)

To operate the water and soap spray it is clamped in position to the faucet or faucets with which it is to function. If the spray is to be located in a position inclined to the walls of the bath tub with which it is to be used, the connection indicated in Figs. 1, 4, 11 and 12 is used. In case the bath tub is provided with a hose coupling nipple, the connections indicated in Figs. 8 and 9 with the rubber hose 286 is used. In case the bath tub is provided with a pair of faucets, the appurtenances shown in Figs. 18 and 19 are used to clamp the spray in position.

To obtain a flow of water through the spray, with any of the different fixtures connecting it with its water supply, the valve or valves for the admission of water to the spray are opened, and which in Figs. 1, 4, 11 and 12 would be the plug valve 114, in Figs. 8 and 9 either or both the valves 282 are opened and in Figs. 18 and 19, the valve 297 is opened. In Figs. 1, 4, 11 and 12 if a flow of water is required for the bath shown with the wall 133, the operating handle 113 is swung to a horizontal position and both the valves 95 and 96 are closed.

Referring now to Figs. 1, 2, 3, 4, 11, 12, 13 and 14, when the valve 114 is located to direct a flow of water to the Y-shaped connection, the water will flow up both the members 104 and 105 thereof. If clear water is to be discharged from the spray head the valve 96 is opened by locating the operating handle 98 in a horizontal position, and the operating handle 97 in a vertical position, which latter then closes the valve 95. If a flow of water with soap in solution is required the valve 96 is closed and the valve 95 is opened. If a diluted solution of soap and water is required to be discharged from the spray heads of the apparatus both the valve 95 and 96 are either fully or partly opened at the option of the user.

Instead of placing the cake of soap 310 in the receptacle 26, the cage 312 with a medicinal substance like sulphur may be used. The temperature of the fluid discharged from the sprays of the water and soap spray may be controlled by the valves like 141 and 143, which are opened the requisite amount to obtain the required temperature. By means of the latter valves also either hot or cold water may be obtained for the spray.

The water when flowing up the pipe 21 after leaving the pipe 86, is directed up the groove of the helical guide 80 and the groove of the flared head 81 thereof, by which the water is given a spiral or twirling movement, the diameter of the path of the stream flowing up the pipe 86 being increased in diameter at its outlet end to spread it. As the stream is discharged from the flared head 22, it impinges against the blades of the propeller wheel 82 and its path of flow is again spread, to encircle and impinge against the cake of soap 310 or cage 312 in the receptacle 26, whereby the said soap is dissolved or the medicinal substance in the cage 312 is either dissolved or mixed with the fluid flowing through said receptacle. The fluid then flows up through the pipes 150, 151 and 160 of the pipe frame, to be discharged from the spray heads thereof if the valves 188 of the latter are opened.

In case the modification indicated in Figs. 8 and 9 is used the whole spray may be raised or lowered by clamping the pipe 273 in different positions.

In case the streams of the spray heads are to flow in practically the same direction the valves 235 and 257 are closed, when streams will only be discharged from the spray heads of the pipe frame. In case streams of fluid are to flow in reverse directions, the said valves 235 and 257 are opened, by means of which the streams will flow from the spray heads of the pipe frame which will be reversed from the streams of the spray heads 251 and 260.

The pipe 206 can be adjusted horizontally and the pipe 230 can be adjusted vertically. The pipes 250 with the members 245 and 246 can be swung to different positions on the tapered plug 239, to either open or close the connection between the ports 242 and 243 and said pipes 250.

The pipe 223 may be swung up so as to close the port 215 with the pipe 208, to prevent the fluid flowing in said pipe 223.

The spray heads 251 can be used either for an overhead shower spray or they may be used for spraying against the body of the user.

The spray heads 176 can be turned to different positions by turning the threaded shanks 181 relatively to the fittings 157. By this means the sprays discharged from the spray heads may be caused to intersect each other end also to be confined within the walls of the bath tub for which they are used.

Various modifications may be made in the invention and the present exemplification is to be taken as illustrative and not limitative thereof.

Having described my invention what I desire to secure by Letters Patent and claim is:

1. In a spray of the character described the combination of a pipe frame comprising a pair of vertical outer pipes and a central vertical pipe, spray heads connected to the pipes of the pipe frame, a pipe spaced from the pipe frame and coacting therewith, a spray head for the latter pipe oppositely positioned to the other spray heads and means to adjust the location of the latter pipe vertically and horizontally.

2. In a spray of the characeter described the combination of a pipe frame, spray heads for the pipe frame, a horizontal pipe extending from the pipe frame, a third pipe collapsible with the latter pipe, a fourth pipe hinged to the third pipe the hinged connection constituting a valve to shut off the flow of the fluid from the third to the fourth pipe in a predetermined position of the latter and a spray head for the fourth pipe.

3. In a spray of the character described the combination of a vertical pipe, a horizontal pipe connected to the vertical pipe, a pipe telescoping with the horizontal pipe, a second vertical pipe, a valve connection between the latter two pipes, the valve closing when the latter vertical pipe is swung up to a horizontal position, a third vertical pipe telescoping with the second vertical pipe, a tapered hollow plug with a pair of ports connected to the lower end of the third vertical pipe, a member of a casing adjustably supported on the plug, a curved spray pipe extending from said member at an opening thereof adapted to register with one of the ports of said plug, a second member of said casing adjustably supported on the plug and a curved spray pipe extending from the said second member at an opening thereof adapted to register with the other port of the plug.

4. In a spray of the character described the combination of a pipe frame, means to supply the pipe frame with a fluid, a pair of outer vertical pipes for the frame, a central vertical pipe for the pipe frame, a horizontal pipe connected to the latter vertical pipe, a second vertical pipe adjustably connected to the horizontal pipe, spray heads extending from the pipes of the pipe frame, means for the second vertical pipe to discharge the fluid in a direction opposite to the discharge of fluid from the said spray heads and means between the horizontal pipe and the second vertical pipe to automatically close off the flow of fluid from the latter pipe when it is placed in a horizontal position.

5. In a spray of the character described the combination of a vertical pipe having an outlet for a fluid, a horizontal pipe coacting with said vertical pipe, a second vertical pipe coacting with said horizontal pipe, a valve casing connected to the latter vertical pipe, a plug valve for the valve casing, a second normally vertical pipe extending from the plug valve, a pipe telescoping with the latter normally vertical pipe and a pair of curved spray pipes coacting with the latter pipe.

6. In a spray of the character described the combination of a pipe frame with outlets for a fluid, a vertical pipe spaced from and coacting with said frame, a pair of swinging curved spray pipes coacting with said vertical pipe, a second vertical pipe coacting with the first vertical pipe and a spray head for the latter pipe positioned to discharge a fluid in a direction opposite to the discharge of the fluid from the outlets of the frame.

7. In a spray of the character described the combination of a pipe frame with outlets, means connected to the pipe frame to cushion the flow of water therein, a horizontal pipe extending from the pipe frame, a vertical pipe coacting with the horizontal pipe and having an outlet oppositely positioned to the other outlets and means to vertically and horizontally adjust the latter outlet.

8. In a spray of the character described the combination of pipes, a fitting connected to each pipe, a second fitting in rotatable engagement with the first fitting, the second fitting having a port for a portion of its length at right angles to the longitudinal axis of its pipe and leading to the interior of the latter and a second portion of its port with its longitudinal axis inclined to the first portion, a casing in rotatable engagement with the second fitting and having a port coaxial with the inclined portion of the port of the second fitting and a body portion for the spray in rotatable engagement with said casing with a hollow neck coaxial with the port in said casing and coacting therewith.

9. In a spray of the character described the combination of pipes, a fitting connected to each pipe, a second fitting in rotatable threaded engagement with the first fitting and having a port connecting with the interior of the pipe, a valve casing in threaded rotatable engagement with the second fitting and inclined thereto, said valve casing having a port connecting with the port of the second fitting, a valve with a port for the valve casing, a cup-shaped body portion for the spray with a neck, said neck in threaded engagement with the valve casing, said neck coaxial with the port in the valve casing and its interior in connection with the latter port and a spray plate for said body portion.

10. In a spray of the character described the combination of a pair of pipes, a receptacle for a dissolvable substance connected to one of said pipes, a pipe frame in connection with both the receptacle and the second of said pipes, spray outlets for the pipe frame, a valve functioning as a by-pass between said pipe frame, the receptacle and the second pipe, means to supply both of said pipes with a fluid, and a helical guide in the pipe leading to the receptacle, said helical guide having a flared head adjacent to said receptacle.

11. In a spray of the character described the combination of a pair of pipes, a receptacle for a dissolvable substance connected to one of said pipes, a pipe frame in connection with both the receptacle and the second of said pipes, spray outlets for the pipe frame, a valve functioning as a by-pass between said pipe frame, the receptacle and the second pipe, means to supply both of said pipes with a fluid, a helical guide in the pipe leading to the receptacle, said helical guide having a flared head adjacent to said receptacle and a propeller wheel journaled at the top of said flared head coacting therewith.

Signed at the borough of Manhattan, city of New York, in the county of New York and State of New York, this 6th day of March A. D. 1924.

ROBERT SWIMMER.